E. J. STERBA & J. H. BIRCH.
MATCH UNLOADING AND BOXER.
APPLICATION FILED FEB. 4, 1909.

933,727.

Patented Sept. 7, 1909.
7 SHEETS—SHEET 1.

Witnesses
Frank A. Fahl
Thomas W. McMeans

Inventors
John Hays Birch
Edward J. Sterba,
By Bufford Hood
Attorneys

E. J. STERBA & J. H. BIRCH.
MATCH UNLOADING AND BOXER.
APPLICATION FILED FEB. 4, 1909.

933,727.

Patented Sept. 7, 1909.
7 SHEETS—SHEET 4.

E. J. STERBA & J. H. BIRCH.
MATCH UNLOADING AND BOXER.
APPLICATION FILED FEB. 4, 1909.

933,727.

Patented Sept. 7, 1909.
7 SHEETS—SHEET 5.

Witnesses
Frank A. Fahle
Thomas W. McMeans

Inventors
John Hays Birch
Edward J. Sterba,

By Bradford Hood
Attorneys

UNITED STATES PATENT OFFICE.

EDWARD J. STERBA, OF CHICAGO, ILLINOIS, AND JOHN HAYS BIRCH, OF CRAWFORDSVILLE, INDIANA, ASSIGNORS TO INDIANA MATCH COMPANY, OF CRAWFORDSVILLE, INDIANA, A CORPORATION OF INDIANA.

MATCH UNLOADING AND BOXER.

933,727.      Specification of Letters Patent.      Patented Sept. 7, 1909.

Application filed February 4, 1909. Serial No. 475,982.

*To all whom it may concern:*

Be it known that we, EDWARD J. STERBA, a citizen of the United States, residing at Chicago, county of Cook, and State of Illinois, and JOHN HAYS BIRCH, a citizen of the United States, residing at Crawfordsville, in the county of Montgomery and State of Indiana, have invented certain new and useful Improvements in Match Unloading and Boxer, of which the following is a specification.

The object of our invention is to produce a mechanism capable of receiving an endless belt comprising a succession of splint-carriers, after the splints have been provided with match heads, and automatically ejecting the completed match from the carriers and depositing the same in predetermined quantities into separate receptacles, the invention having for its especial object the production of mechanism by means of which the discharged matches will be kept straight and deposited in a straight and even-lying quantity into the receiving boxes.

The machine forming the subject-matter of this application forms a part of a continuous match making system which forms the subject-matter of a companion application No. 475,983. The endless carrier which runs through this machine and delivers completed matches thereto also runs through and receives splints from a splint producing machine which forms the subject-matter of another companion application No. 475,981.

The accompanying drawings illustrate our invention.

Figure 11:
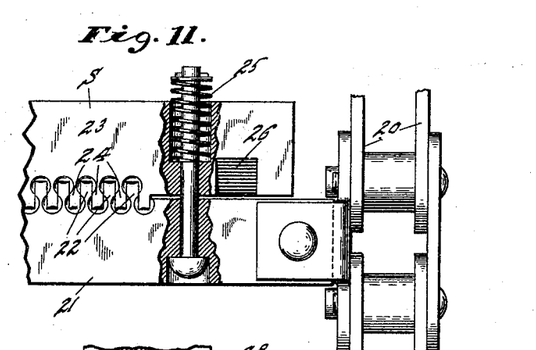
Fig. 11 a fragmentary detail of one of the splint carriers in its unloaded condition.
Figure 12:
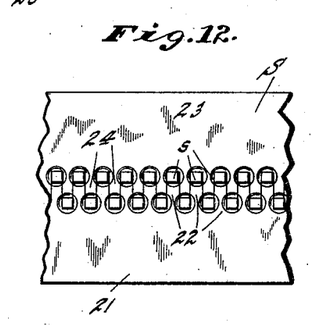
Fig. 12 a fragmentary detail of a middle portion of one of the splint carriers loaded with splints.

In the drawings S indicates a splint carrier numbers of which are combined with a pair of chains 20 to form an endless belt to deliver completed matches to the mechanism to be described. The splint carrier is described and claimed in companion application No. 475,981, above mentioned, and it comprises a main bar 21 having a plurality of separated fingers 22 each of which is of a width equal to the dimension of a match splint and which are separated by a space equal to a match splint. Carried by, and co-operating with, bar 21 is a bar 23 which is also provided with a plurality of fingers 24 which are interdigitated with the fingers 22 of bar 21, the arrangement being such that, by a slight separation of bar 23 from bar 21, longitudinally of the fingers, spaces are formed between the roots of the fingers for the reception of two parallel series of match splints *s* which, when they reach the machine now to be described, are firmly held in place by means of springs 25 which yieldingly urge bar 23 toward its bar 21. Each bar 23, near its end, is provided with a transversely tapered recess 26 adapted to receive a separating wedge, to be hereafter described.

The endless belt, comprising the splint carriers S is delivered to a pair of sprocket wheels 27 lying freely within the bight of the belt which is carried thence under said sprocket wheels and up over a pair of sprocket wheels 29, 29, carried by a shaft 31 journaled at the upper end of the main frame 28, the belt passing over said sprocket wheels 29 and vertically downward to and back under a pair of sprocket wheels, 32, 32 carried by a shaft 33. Secured to shaft 33 is a ratchet wheel 34 (dotted lines Fig. 4) which is advanced step-by-step by means of a pawl 35 carried by a lever 36, driven by a link 37 connected to a lever 38, (Fig. 3) which, in turn, is connected to an eccentric arm 39 carried by an eccentric 40 on the main drive shaft 40'. From sprockets 32 the endless belt passes back to a splint forming mechanism which, as previously stated, forms the subject-matter of companion application No. 475,981.

Figure 1:
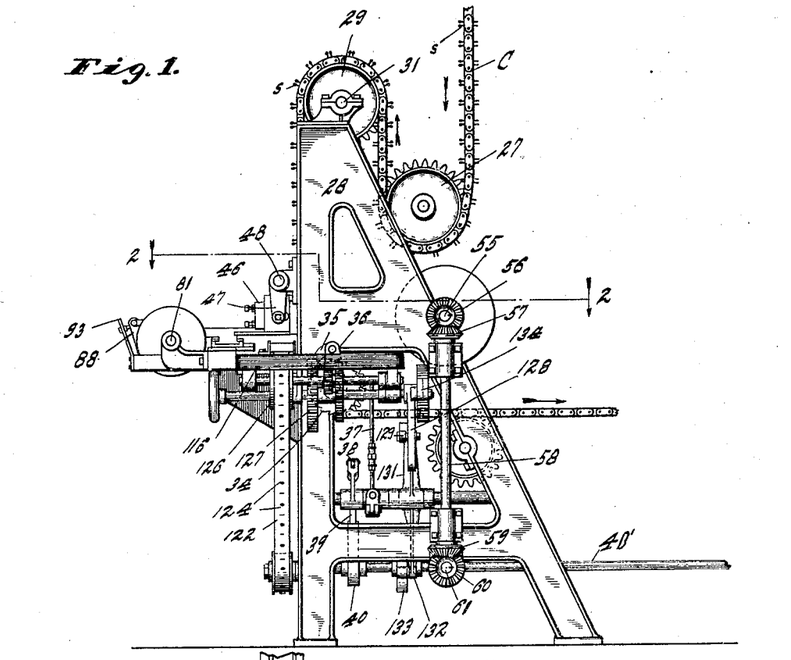
Figure 1 is an elevation of the discharge side of the machine.
Figure 2:
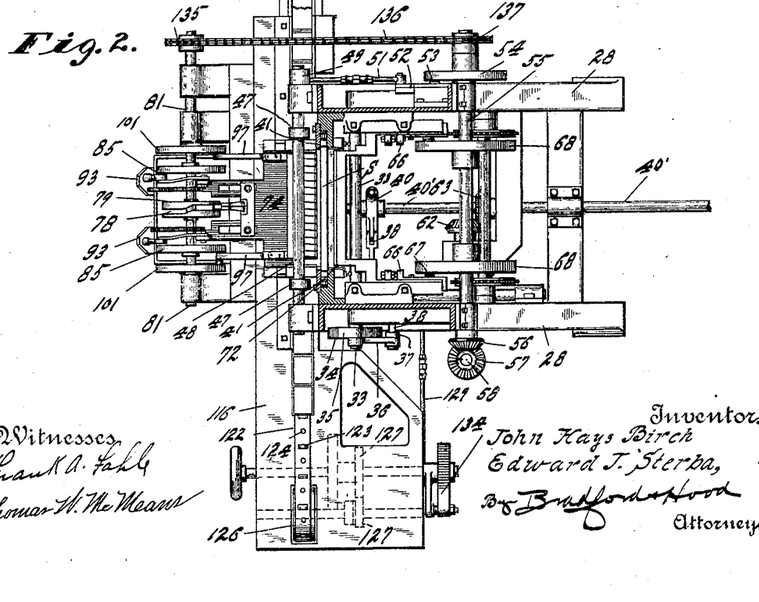
Fig. 2 a sectional plan on line 2—2 of Fig. 1.
Figure 13:
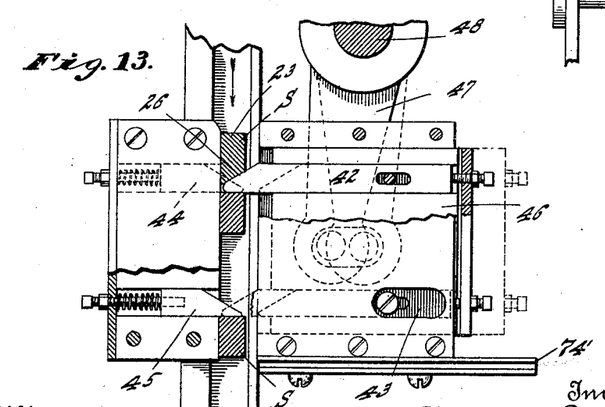
Fig. 13 a vertical sectional detail of the mechanism for opening the splint carriers to permit the initial and final ejections of splints.

Arranged at each side of the machine, so as to receive the chains 20 of the endless belt, are vertically arranged guides 41 through which the chains may pass freely vertically but which serve to hold said chains, throughout the length of the guides, against lateral displacement. Adjacent each guide 41 we mount a pair of wedge fingers 42 and 43 (Fig. 13) which are separated from each other by a distance equal to the distance between two splint carriers S of the endless belt and each of said fingers is provided with a wedge shaped end adapted to enter the inclined recesses 26 of bars 23 so as to separate such bar from its companion and thus release the splints s carried therein. In order to prevent any back-lash of the endless carrier during the wedge action of the fingers 42, we provide a pair of spring-stops 44 and 45 over which the bars 21 may readily pass in the forward direction, said bolts yielding to such movement, but which will immediately spring behind said bars 21 to prevent any rearward movement thereof. Each pair of wedge fingers 42 and 43 is carried in a head 46 which is reciprocated toward and from the plane of the endless carrier by means of an arm 47 carried by a rock shaft 48. Secured to rock shaft 48 is an arm 49 (Fig. 2) connected by a link 51 with a cam slide 52, the pin 53 of which enters a suitably formed cam-groove in a cam-disk 54 carried by a shaft 55 connected by a gear 56, gear 57, shaft 58, gears 59 and 60 (Fig. 1), shaft 61, and gears 62 and 63 (Fig. 2) with the main drive shaft 40'.

Arranged to the rear of the vertical portion of the endless carrier, opposite the discharging position, (Fig. 4) is a crosshead 65 provided with a pair of cam slides 66, 66, (Figs. 2 and 4) one at each end of the crosshead, each of said cam slides having a pin 67 which enters a suitably formed cam-groove formed in an adjacent cam-disk 68, the two cam-disks being secured to shaft 55. Each of the cam-slides 66 is adjustable relative to the cross-head by means of a temper screw 69 and clamping screw 71. Cross-head 65 carries an ejecting bar 72, and also carries two series of ejecting pins 73 adapted to engage the matches carried by the splint carrier in ejection position while the ejecting bar 72 engages the matches carried by an immediately succeeding splint carrier. The ends of pins 73 project through a guide plate 73'.

Machines have been heretofore designed for ejecting completed matches from carriers and depositing the same in predetermined numbers into boxes or other receptacles but, so far as we are aware, in most of such mechanisms difficulty is experienced by reason of the tendency of the ejected matches to become overlapped or crossed one over another and thus prevent their proper introduction into the receptacles.

The mechanism now to be described receives the completed matches in a plurality of groups comparatively small in number, and under such conditions that, during their short permissible drop, they cannot become crossed.

Arranged in front of the belt, slightly below the ejecting pins 73, is a plate 74 carried in fixed guides 74'. A bar 75 mounted in guide-way 76 is movable in a horizontal plane parallel with the plane of the vertical portion of the endless belt shown in Fig. 4. Bar 75 carries a finger 77 which projects into a cam-groove 78 of a cam 79 carried by a shaft 81 journaled on the main frame. Said cam groove 78 being adapted to intermittently shift bar 75 in its guide-block 76. Plate 74 is held against buckling by means of a clip 82, and bolts 83, which pass through said clip and large slots 84 formed in plate 74, so that said plate does not partake of the movement of bar 75. In order to move plate 74 we provide a pair of cam-disks 85, 85 attached to shaft 81 and each of these cam-disks is provided with a cam-groove 86 (Fig. 6), said cam-groove having two periods of rest and two periods of movement, as clearly shown. Taking into each cam-groove 86 is a pin 87 of a lever 88 to the outer end of which is pivoted a link 89 pivotally connected to plate 74. The rotation of shaft 81, while sufficient to produce rapid enough movement for the inward or closing strokes of plate 74, is not sufficient to produce rapid enough withdrawing movement of the plate, and for that reason the cam-groove 86 is mutilated or opened at the point 91, just at the end of the inner period of rest, and a spring 92 is connected to the plate 74 and a stationary arm 93 so that, when the cam 85 is rotated far enough to bring the opening 91 of groove 86 opposite pin 87, the spring 92 will serve to very rapidly withdraw plate 74. A buffer 94 is arranged in the path of movement of lever 88 so as to take the force of the blow at the end thereof. The guideway 76 is formed in a block 95 which, in turn, is mounted in a horizontal guide-way 96, at right angles to the guide-way 76, so that block 95, with all the parts it carries, may be shifted horizontally toward and from the vertical portion of the endless belt. Secured rigidly to the opposite ends of bar 75 are two transversely-projecting arms 97, 97 each of which, at its rear end, carries a pin 98 projected into a cam-groove 99 of one of a pair of cam-disks 101, 101 secured to the shaft 81, the arrangement being such that bar 75 may be given by cams 101, a movement toward and from the plane of the match carriers, and may be given, by cam 79, a horizontal movement parallel with said plane.

Figure 8:
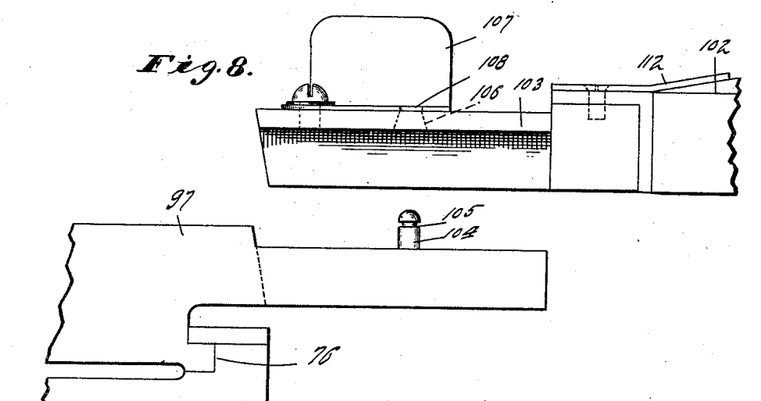
Fig. 8 a detail showing the manner of removably attaching the receiver pan to its operating frame.
Figure 9:
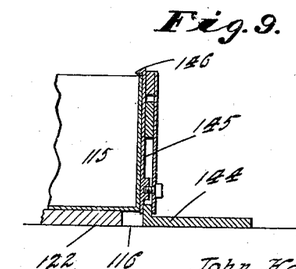
Fig. 9 a vertical sectional detail of one of the guards for the edges of the box trays.
Figure 10:
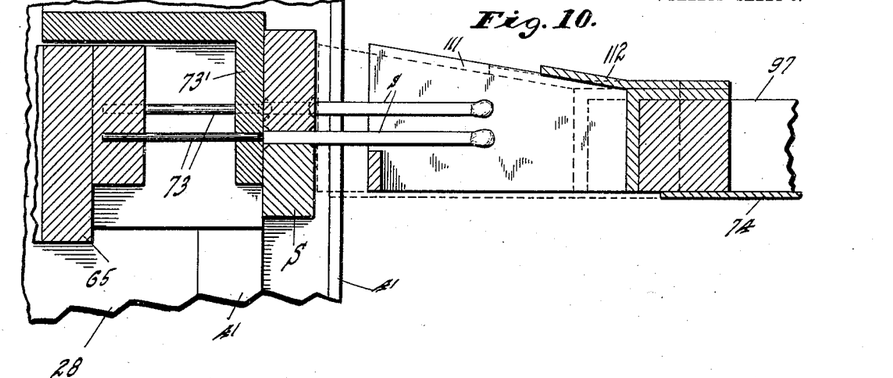
Fig. 10 a vertical sectional detail, about full size, of the receiver pan and adjacent parts.
Figure 14:
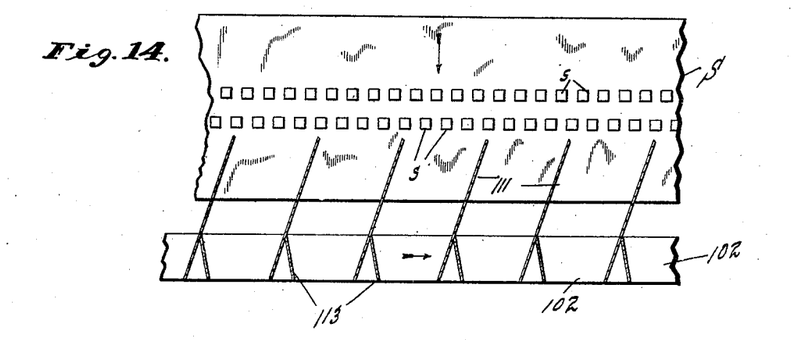
Fig. 14 a diagram showing a portion of the receiver pan in vertical section and a loaded splint carrier diagrammatically, in the positions just prior to the association of the splints with the receiver pan.
Figure 15:
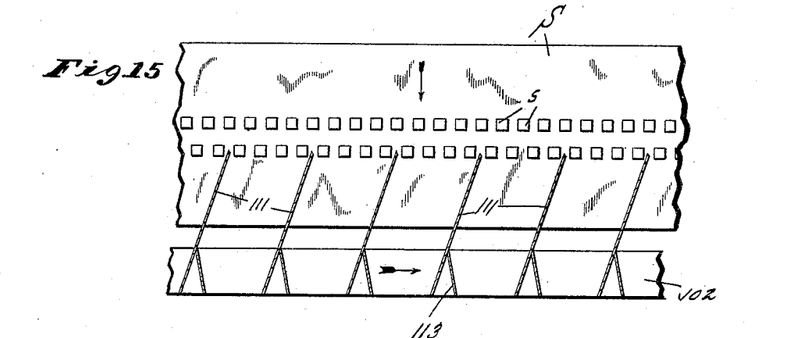
Fig. 15 a similar view showing the initial relative movements between the splint carrier and receiver pan.
Figure 16:
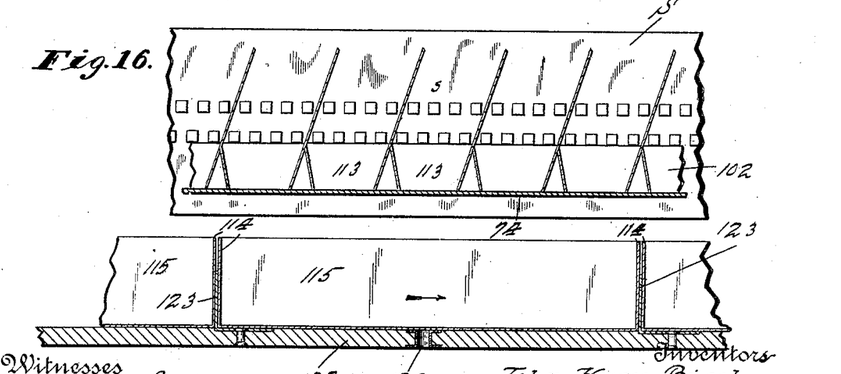
Fig. 16 a similar view showing the final positions of splint carrier and receiver pan immediately before ejection of the splints from the splint carrier, and also showing a series of box trays, and the carrier therefor being shown in receiving position.

Secured to arms 97 is a cellular receiver 102 which thus receives all of the movements of bar 75. The receiver 102 is provided with a pair of arms 103, 103 by means of which it may be attached to and detached from arms 97, said arms 97 each carrying a pin 104 (Fig. 8) having an annular groove 105 near its upper end, and each arm 103 being perforated at 106, to receive pin 104, and carrying a pivoted latch 107 having a slot 108 adapted to coöperate with groove 105 of pin 104. The cellular receiver 102 comprises a plurality of partitions 111, which are inclined from the vertical to the angle of displacement of the upper series of splints s, relative to the lower series, as clearly shown in Figs. 14 to 16. The provision of partitions 11 is for the purpose of subdividing the two series of matches or splints s into comparatively small groups so as to thus limit the possible horizontal swing of any match or splint across its fellows, but, as the two series of splints or matches s have been formed from a continuous ribbon of material by lateral displacement in one direction only, the upper series of splints or matches s exactly blocks the spaces between the splints or matches of the lower series and it would be impossible to insert exactly vertical partitions between matches. It is for this reason that the partitions 111 are inclined from the vertical and are given a sidewise movement simultaneously with the downward movement of the match carriers S, as will appear more fully in the description of operation.

The ends of partitions 111 most distant from the plane of the match carrier, are guarded by a cover plate 112, beneath which the head-ends of the matches are projected by the action of pins 73. The space between the lower edges of partitions 111 are partially, but only partially blocked by means of oppositely inclined deflector plates 113, one of which is secured to each partition 111 and is separated from the lower edge of its partition by an amount somewhat in excess of the space occupied by adjacent ends 114 of adjacent box trays 115, thus preventing the falling matches from dropping upon the ends of the box trays and becoming horizontally swung thereby. The open spaces between the lower edges of the partitions 111 are closed by plate 74 upon which the cellular receiver directly rests and slides.

Extending horizontally beneath plate 74, a suitable distance therefrom, is a plate or runway 116 which is carried upon vertically adjustable standards 117 carried upon adjusting screws 118 connected by gears 119 and 120 with an adjusting shaft 121. Running over the table 116 is a feed belt 122 provided, at suitable distances, with lugs 123 between which box trays 115 may be placed and accurately spaced. Any suitable means for intermittently driving belt 122 may be provided but such means should be of a character to insure accuracy of movement, in order to insure accuracy of number of matches deposited in the boxes, and a convenient manner of obtaining the desired result is to provide the belt 122, at suitable distances, with eyelets 124, (Fig. 16) adapted to receive teeth 125 (Fig. 3) of a driving wheel 126 which is geared to a driving gear 127 provided with a slotted operating lever 128 to which is adjustably attached a link 129 connected by a crank 131 with an eccentric strap 132 mounted upon an eccentric 133 carried by the main drive shaft 40', the several parts being relatively adjustable so that any desired intermittent advancement of the box-feed belt 122 may be obtained, such advancement being always equal to the distance between two partitions 111, or some multiple thereof. Lever 28 is connected by a pawl-and-ratchet connection 134 (Figs. 1 and 2) with the shaft of gear 137. Shaft 81 is connected by sprocket wheel 135, (Fig. 2), sprocket chain 136, and sprocket wheel 137 with shaft 55 so as to rotate in unison therewith.

It is desirable that the sides of the box trays 115 be prevented from bulging while in receiving position, and that they be protected in such manner as to facilitate the entrance of the matches into the trays, and for that purpose we provide at one edge of plate 116, a spring plate 141 (Fig. 4) having a hook-shaped upper edge 142 beneath which one side of the tray 115 may lie. The plate 141 is vertically adjustable by means of an adjusting clamp 143 so that trays of different heights may be accommodated. Secured to table 116, opposite the spring plate 141, is a bracket 144 which carries a vertically adjustable plate 145 having a hook-shaped upper edge 146 beneath which one side of trays 115 may pass.

In order to prevent any slack in that portion of the belt C immediately preceding the discharge position, shaft 31 is provided at one end with a friction wheel 151 which coöperates with a friction shoe 152 so that the pull exerted by sprocket wheels 32 upon the belt C, to drive the same through the machine, is exerted against the friction between wheel 151 and shoe 152.

Figure 7:
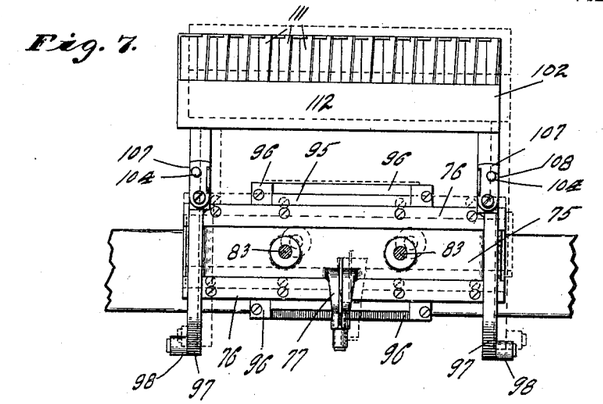
Fig. 7 a detail plan of the cellular receiver-pan and associated parts.

The operation is as follows:—Shaft 41 is rotated continuously and the endless belt C, comprising the match carrying members S loaded with matches, is advanced through the machine, step-by-step, by means of the shaft 33. When the first loaded carrier S lies opposite the ejecting bar 72, fingers 42 will be projected into the notches 26 of that carrier so as to release the matches and permit the ejecting bar 72, as it moves to the right (Fig. 4) to partially eject the matches from the holder S so that their ends will lie flush with the back of the carrier S. The next advancement of the belt C brings said carrier S immediately opposite plate 73' so that the matches carried by said bar S lie in alinement with the ejecting pins 73. During this downward movement cams 101 have first projected the receiver 102 horizontally toward the plane of the belt C so that, when the lower series of matches $s$ (Fig. 14) lies immediately above the upper edges of partitions 111, said partitions occupy the position shown in Fig. 14. Further downward movement of the carrier is accompanied by a horizontal movement of the receiver 102, as indicated by the arrow in Fig. 15, so that the upper edges of the partitions 111 enter between matches $s$ of the lower series, and, the downward movement of the carrier S and the horizontal movement of the receiver continuing, the matches $s$ are projected into the spaces between the partitions 111, to the position shown in Figs. 16 and 4, at which time the belt C comes to rest with the carrier S under consideration, opposite pins 73. By this time cams 85 have rotated to a position where levers 88 are swung to the position indicated in dotted lines in Fig. 4 and plate 74 is projected toward the plane of the belt C so as to close the open lower ends of the spaces between partitions 111 thus forming a plurality of match receiving cells. Thereupon head 65 is projected again toward the plane of the belt C and fingers 42 and 43 are also projected toward the plane of the belt so that the bars of the carrier S under consideration, and the next succeeding carrier S, are separated so as to release the matches therein, in the manner already described; bar 72 operates in the manner already described, and pins 73 eject matches into the match receiving cells of the receiver 102, said matches, having but a very slight distance to fall, falling upon plate 74 and being kept straight by engagement with each other, and the lower edges of partitions 111, and the deflectors 113 so that said matches (a comparatively small number in each cell) lie properly upon plate 74. Thereupon block 95 is drawn away from the plane of the belt C, to the position indicated by full lines in Fig. 7, where the matches in the receiver 102, lie immediately above the trays 115 on belt 122. Just at this point cams 85 have rotated enough to bring the mutilated portion 91 thereof opposite pins 87 so that springs 92 serve to suddenly withdraw plate 74 from beneath the matches in the cells of receiver 102. This retracting movement of the plate 74 taking less time than inertia of the matches, so that the matches within the receiver drop squarely into the trays 115, said matches being preliminarily bunched or compacted by plates 113, so that they cannot possibly engage the ends 114 of said trays. Continued movement of shaft 40' causes an advancement of belt 122 and a repetition of the actions already described.

The number of matches deposited in a box will of course always be a multiple of the number of matches deposited at any one time in one of the cells of the receiver 102, assuming said cells to be of uniform size) and will depend upon the time occupied by each box as it traverses the receiver 102.

Figure 3:
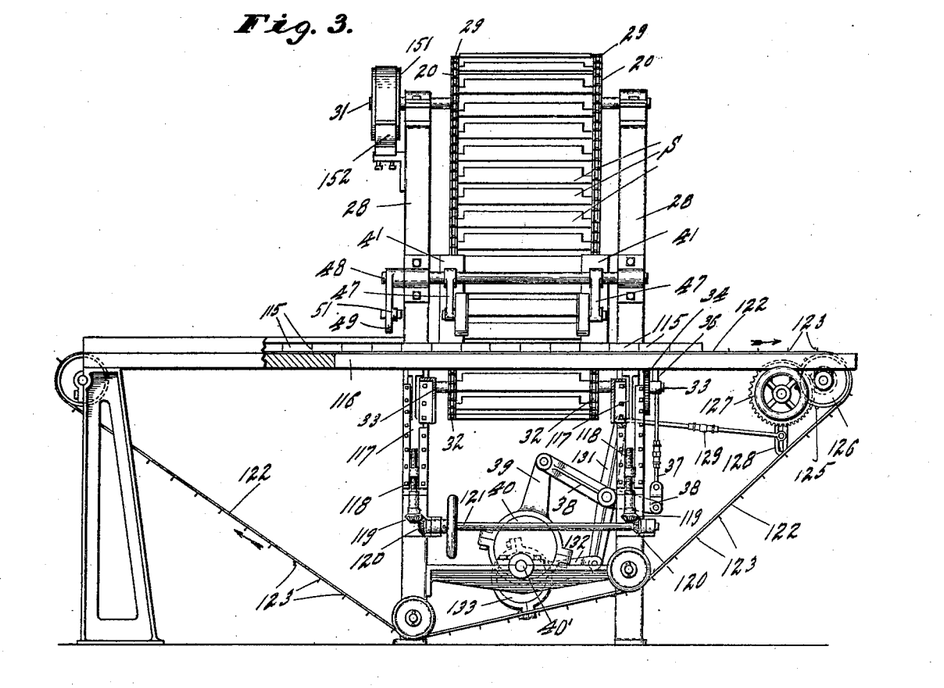
Fig. 3 a front elevation with the match-receiving pan and its operating mechanism omitted in order to show mechanism which would be otherwise hidden thereby.
Figures 4, 6:
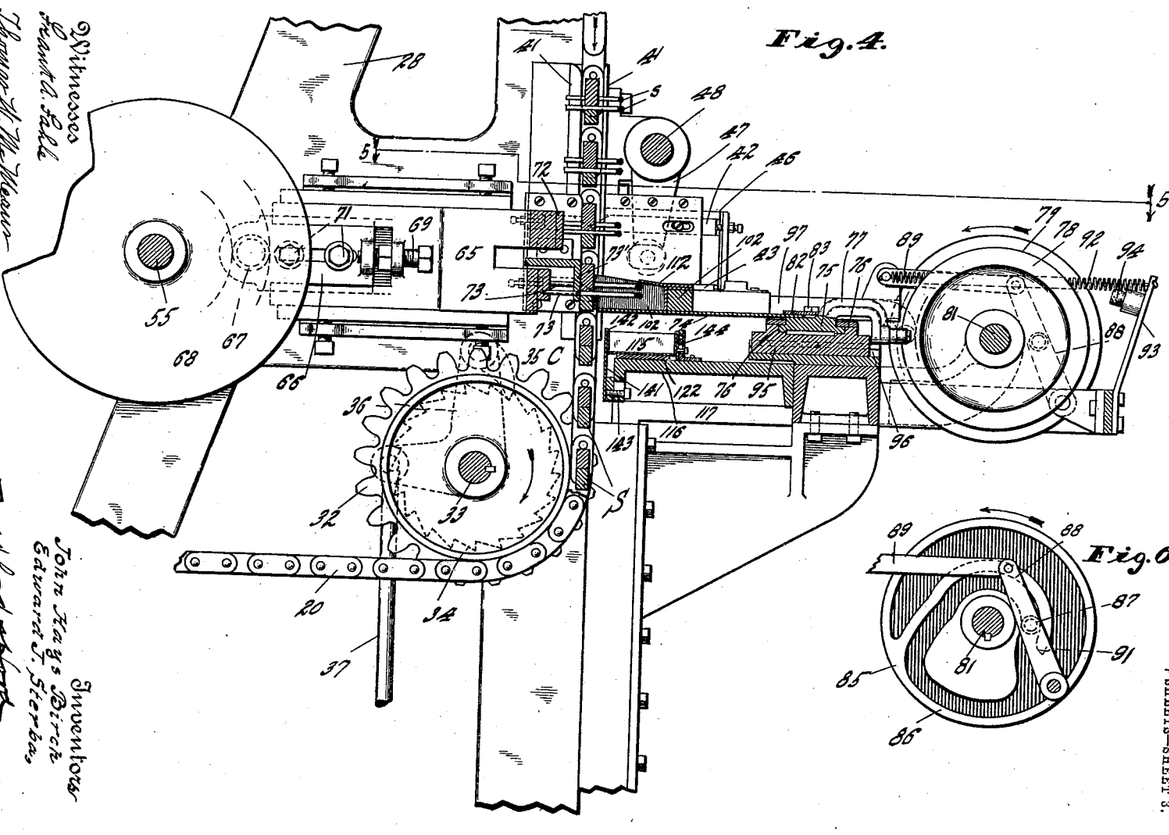
Fig. 4 a vertical section on line 4—4 of Fig. 5.
Fig. 6 a detail of one of the receiver-bottom operating cams.
Figure 5:
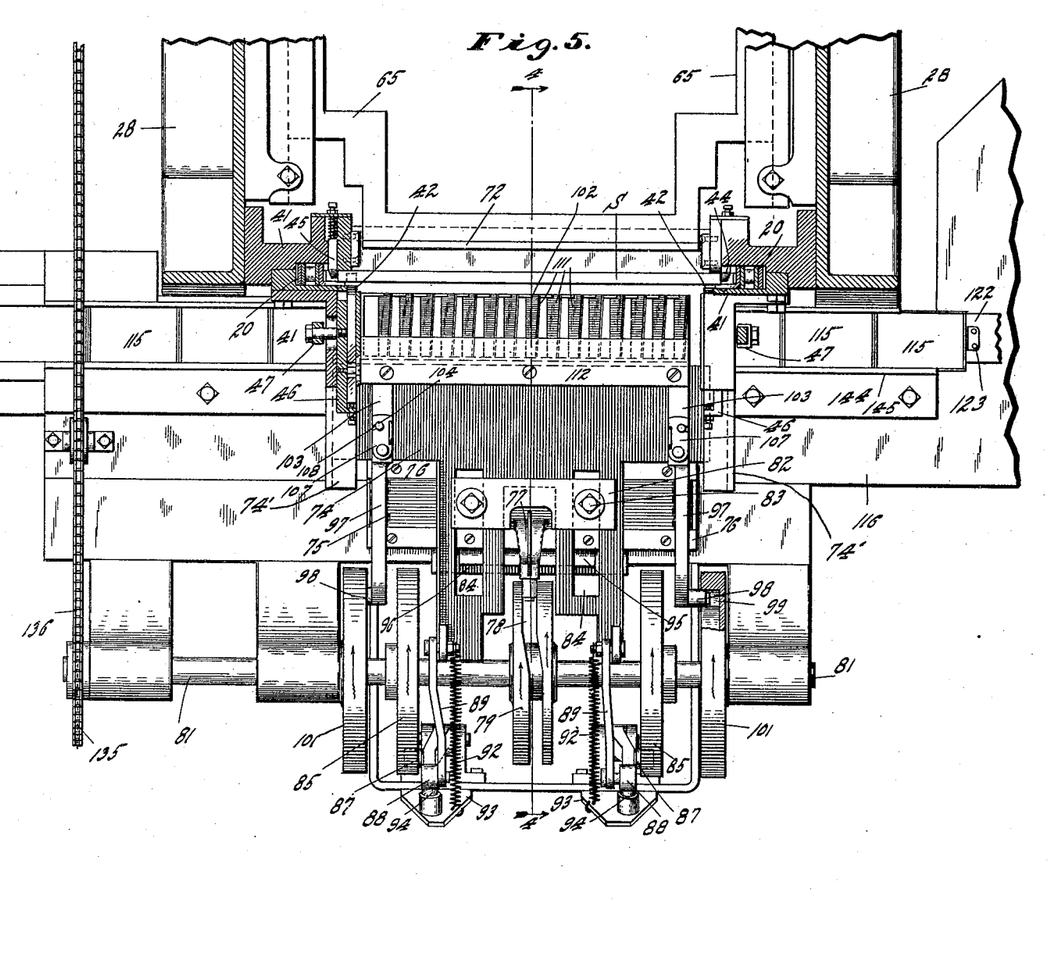
Fig. 5 a horizontal section on line 5—5 of Fig. 4, the parts in Figs. 4 and 5 being shown upon a scale considerably larger than the scale of the preceding figures.

The operation of the machine is entirely automatic and the only manual operation required is that of placing empty trays upon the belt 122 (at the left Fig. 3) and the removal of the filled tray from said belt (at the right Fig. 3.)

We claim as our invention:

1. In a machine of the class described, the combination, with a series of match carrying members each carrying a plurality of matches in two series displaced from each other in the line of movement of the carrier, and means for successively bringing said carriers to discharging position, of a cellular receiver comprising a plurality of partitions inclined relative to the line of movement of the match carriers, means for associating the partitions of the receiver with matches in a match carrier by a relative movement of the carrier and partitions in the line of inclination of the partitions, means for ejecting the matches from the carrier into the spaces between said partitions, and means for discharging the matches from the receiver.

2. In a machine of the class described, the combination, with a series of match carrying members each carrying a plurality of matches in two series displaced from each other in the line of movement of the carrier, and means for successively bringing said carriers to discharging position, of a cellular receiver comprising a plurality of partitions inclined relative to the line of movement of the match carriers, deflectors arranged at the lower ends of said partitions, means for associating the partitions of the receiver with matches in a match carrier by a relative movement of the carrier and partitions in the line of inclination of the partitions, means for ejecting the matches from the carrier into the spaces between said partitions, and means for discharging the matches from the receiver.

3. In a machine of the class described, the combination, with a series of match carrying members each carrying a plurality of matches in two series displaced from each other in the line of movement of the carrier, and means for successively bringing said carriers to discharging position, of a cellular receiver comprising a plurality of partitions inclined relative to the line of movement of the match carriers, means for associating the partitions of the receiver with matches in a match carrier by a relative movement of the carrier and partitions in the line of inclination of the partitions, means for ejecting the matches from the carrier into the spaces between said partitions, a bottom plate forming a part of said match receiver and adapted to close the lower ends of the spaces between said partitions, and means for suddenly withdrawing the bottom plate from beneath matches deposited thereon.

4. In a machine of the class described, the combination, with a series of match carrying members each carrying a plurality of matches in two series displaced from each other in the line of movement of the carrier, and means for successively bringing said carriers to discharging position, of a cellular receiver comprising a plurality of partitions inclined relative to the line of movement of the match carriers, deflectors arranged at the lower ends of said partitions, means for associating the partitions of the receiver with matches in a match carrier by a relative movement of the carrier and partitions in the line of inclination of the partitions, means for ejecting the matches from the carrier into the spaces between said partitions, a bottom plate forming a part of said match receiver and adapted to close the lower ends of the spaces between said partitions, and means for suddenly withdrawing the bottom plate from beneath matches deposited thereon.

5. In a machine of the class described, the combination, with a plurality of match carriers, each carrying two series of separated matches, the matches of one series being displaced from the matches of the other series both in the direction of movement of the carrier and in a direction at right angles thereto in the plane of movement of the carrier, and means for successively bringing said carriers to discharging position, of a cellular match receiver comprising a plurality of partitions inclined relative to the line of movement of the match carriers to coincide with the displacement of the matches of one series relative to the matches of the other series, a bottom plate adapted to intermittently close the spaces between the lower edges of the partitions, means for laterally shifting the receiver simultaneously with the advancing movement of the match carriers to discharging position whereby the inclined partitions will pass between adjacent matches of the two series, means for ejecting the matches from the carrier to the spaces between said partitions and upon said bottom plate, and means for withdrawing the bottom plate from beneath the matches deposited thereon.

6. In a machine of the class described, the combination, with a plurality of match carriers, each carrying two series of separated matches, the matches of one series being displaced from the matches of the other series both in the direction of movement of the carrier and in a direction at right angles thereto in the plane of movement of the carrier, and means for successively bringing said carriers to discharging position, of a cellular match receiver comprising a plurality of partitions inclined relative to the line of movement of the match carriers to coincide with the displacement of the matches of one series relative to the matches of the other series, deflector plates arranged at the lower edges of said partitions, a bottom plate adapted to intermittently close the spaces between the lower edges of the partitions, means for laterally shifting the receiver simultaneously with the advancing movement of the match carriers to discharging position whereby the inclined partitions will pass between adjacent matches of the two series, means for ejecting the matches from the carrier to the spaces between said partitions and upon said bottom plate, and means for withdrawing the bottom plate from beneath the matches deposited thereon.

7. In a machine of the class described, the combination, with a plurality of match carriers, each carrying two series of separated matches, the matches of one series being displaced from the matches of the other series both in the direction of movement of the carrier and in a direction at right angles thereto in the plane of movement of the carrier, and means for successively bringing said carriers to discharging position, of a cellular match receiver comprising a plurality of partitions inclined relative to the line of movement of the match carriers to coincide with the displacement of the matches of one series relative to the matches of the other series, a bottom plate adapted to intermittently close the spaces between the lower edges of the partitions, a carrier for said cellular receiver comprising a bar movable transversely of the line of movement of the match carrier, means for shifting said bar, a guide bar for said bar movable toward and from the plane of the carrier, means for reciprocating said guide bar, a bottom plate for said receiver adapted to intermittently close the bottoms of the spaces between the partitions thereof, and means for withdrawing said bottom plate, said means comprising a mutilated cam, and a spring acting upon the bottom plate to withdraw the same when the point of mutilation of the cam is reached.

8. In a machine of the class described, the combination, with a plurality of match carriers, each carrying two series of separated matches, the matches of one series being displaced from the matches of the other series both in the direction of movement of the carrier and in a direction at right angles thereto in the plane of movement of the carrier, and means for successively bringing said carriers to discharging position, of a cellular match receiver comprising a plurality of partitions inclined relative to the line of movement of the match carriers to coincide with the displacement of the matches of one series relative to the matches of the other series, deflector plates arranged at the lower edges of said partitions, a bottom plate adapted to intermittently close the spaces between the lower edges of the partitions, a carrier for said cellular receiver comprising a bar movable transversely of the line of movement of the match carrier, means for shifting said bar, a guide bar for said bar movable toward and from the plane of the carrier, means for reciprocating said guide bar, a bottom plate for said receiver adapted to intermittently close the bottoms of the spaces between the partitions thereof, and means for withdrawing said bottom plate, said means comprising a mutilated cam; and a spring acting upon the bottom plate to withdraw the same when the point of mutilation of the cam is reached.

9. In a machine of the class described, the combination, with a plurality of match carriers, each carrying two series of separated matches, the matches of one series being displaced from the matches of the other series both in the direction of movement of the carrier and in a direction at right angles thereto in the plane of movement of the carrier, and means for successively bringing said carriers to discharging position, of a cellular match receiver comprising a plurality of partitions inclined relative to the line of movement of the match carriers to coincide with the displacement of the matches of one series relative to the matches of the other series, a bottom plate adapted to intermittently close the spaces between the lower edges of the partitions, a carrier for said cellular receiver comprising a bar movable transversely of the line of movement of the match carrier, means for shifting said bar, a guide bar for said bar movable toward and from the plane of the carrier, means for reciprocating said guide bar, a bottom plate for said receiver adapted to intermittently close the bottoms of the spaces between the partitions thereof, and means for withdrawing said bottom plate.

10. In a machine of the class described, the combination, with a plurality of match carriers, each carrying two series of separated matches, the matches of one series being displaced from the matches of the other series both in the direction of movement of the carrier and in a direction at right angles thereto in the plane of movement of the carrier, and means for successively bringing said carriers to discharging position, of a cellular match receiver comprising a plurality of partitions inclined relative to the line of movement of the match carriers to coincide with the displacement of the matches of one series relative to the matches of the other series, deflector plates arranged at the lower edges of said partitions, a bottom plate adapted to intermittently close the spaces between the lower edges of the partitions, a carrier for said cellular receiver comprising a bar movable transversely of the line of movement of the match carrier, means for shifting said bar, a guide bar for said bar movable toward and from the plane of the carrier, means for reciprocating said guide bar, a bottom plate for said receiver adapted to intermittently close the bottoms of the spaces between the partitions thereof, and means for withdrawing said bottom plate.

In witness whereof, we have hereunto set our hands and seals at Crawfordsville, Indiana, this 26" day of January, A. D. one thousand nine hundred and nine.

EDWARD J. STERBA. [L. S.]
JOHN HAYS BIRCH. [L. S.]

Witnesses:
E. L. JOHNSON,
W. A. SIDENER.